though patented February 16, 1960

2,925,405

LINEAR POLYESTERS CONTAINING AN ALKYLENE DIAMINE GROUP AND MANUFACTURE THEREOF

Thomas M. Laakso and Jack L. R. Williams, Rochester, N.Y., assignors to Eastman Kodak Company, Rochester, N.Y., a corporation of New Jersey No Drawing. Application April 26, 1955
Serial No. 504,107

3 Claims. (Cl. 260—75)

This invention relates to improved linear polyesters and to the manufacture thereof and shaped articles prepared therefrom. More particularly, the invention is concerned with highly polymeric linear polyesters characterized by a regular, rather than a random, structure and containing regularly recurring amide linkages, and to methods of making such polyesters from a new type of monomeric dicarboxylic compound containing amide linkages.

The linear condensation polymers generally fall into two classes, viz. the polyesters and the polyamides. The polyesters are condensation products of one or more glycols with one or more dicarboxylic acids. The polyamides are condensation products of dicarboxylic acids with diamines. Both broad types of condensation polymers in highly polymeric form were shown by Carothers in U.S. 2,071,250. The polyamide polymers are best typified by the nylon-type polymers, for which the advantages and disadvantages are well known. More recently, emphasis has been on development of the polyesters, and among the more widely known polymers of this type are the condensation products of terephthalic acid (usually in ester form) with a polymethylene glycol containing 2–10 methylene groups.

Both the polyesters and the polyamides possess certain advantages and certain disadvantages. The polyesters possess high melting points and exceptional strength characteristics, but the terephthalates are highly insoluble and very difficult to dye. An attempted modification in order to achieve the desirable properties of both the polyesters and the polyamides was disclosed by Carothers and involved coreacting a dicarboxylic acid, a glycol and a diamine to form a "polyester-amide." In such polyester-amides, however, there are the competing reactions of polyester formation and polyamide formation, and the properties of the resulting products were disappointing. An attempt to improve the properties of the polyester-amides was shown by Brubaker et al. U.S. 2,224,037 where an excess of ester was used to try to overcome the tendency for polyamide formation in preference to polyester formation. Even in this case, however, the melting points of the mixed polymers was very low and the polyester-amides known heretofore have not approached the terephthalate polyesters in utility.

In the preparation of condensation polymers, it is desirable to be able to form polymers having a sufficient inherent viscosity to achieve film and fiber-forming products with good physical characteristics. When the fiber-forming stage is reached, the polymers are capable of being oriented by being stretched either longitudinally or laterally or both, and the oriented polymers possess unusual tensile strength, flexibility, elongation and similar physical properties. It has been recognized that the presence of amino groups or amide linkages in condensation polymers should improve solubility, dyeability and the like, but heretofore the other properties such as softening temperature have suffered such a decline that polyester-amides have not achieved widespread commercial acceptance. Furthermore, the presence of amide linkages often results in products with undesirable color. Consequently, it has been desirable to discover some method of forming polymers which retain the desirable properties of polyesters, such as the polyethylene terephthalate esters, but which also include amide linkages effective to improve dyeability, processability, moisture absorption and the like.

It is accordingly an object of this invention to provide new and improved highly polymeric linear polyesters containing amide linkages effective to overcome the disadvantages inherent in prior polyesters without sacrificing the desirable properties characteristic of polyesters, particularly of the terephthalate type.

It is another object of the invention to prepare hitherto unknown homogeneous polyesters possessing regularly recurring polyester-amide structural units but free of the disadvantages usually associated with polyester-amides.

A further object of the invention is to employ new monomeric bifunctional dicarboxylic compounds containing amide linkages equal in number to the ester groups for polyester formation with one or more alkylene glycols, and preferably polymethylene glycols.

Another object of the invention is to provide a new class of highly polymeric linear condensation polymers having physical properties at least as good as any polymers known to the art, and possessing a combination of properties not possible with polymers known heretofore.

Another object of the invention is to provide polymeric materials having unusual utility in the manufacture of shaped articles such as fibers, films, sheeting and the like, and capable of being oriented to give unusual strength, toughness, flexibility, and elasticity combined with improved dyeability, solubility, processability and moisture absorption without objectionable color formation and the sacrifice of softening temperature.

Another object of the invention is to provide polymeric materials possessing unusual utility as film base materials for the manufacture of either black and white or color photographic film of exceptional strength, wear resistance and dimensional stability.

Other objects will be apparent from the description and claims which follow.

These and other objects are attained by means of this invention wherein highly polymeric linear condensation polymers having a regular structure composed of a succession of recurring structural units of the formula

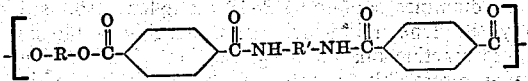

wherein R and R' are the same or different alkylene groups containing 2–10 carbon atoms, are prepared by polymerizing a glycol ester of the formula

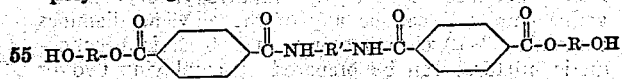

obtained by reacting at least one alkylene glycol of 2–10 carbon atoms, preferably a polymethylene glycol, with at least one ester of a dicarboxylic acid of the formula

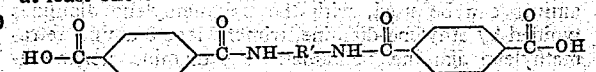

In accordance with the invention, the ester of the dicarboxylic acid of the formula

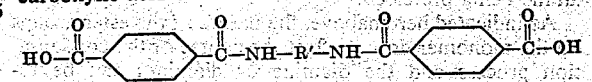

which is reacted with the glycol, is prepared and used in monomeric form, whereby a completely regular structure is obtained since there are no competing polyester and polyamide reactions during the polymerization. Instead, the polymerization reaction is a polyester reaction between the bifunctional dicarboxylic compound and the bifunctional glycol, and the products obtained differ greatly from the mixed polyester-amides of random structure obtained by coreacting a glycol, a dibasic acid and a diamine. Thus, the polymers embodying the invention are readily made in viscosities sufficient for formation of fibers having the improved properties characteristic of oriented polymers, and can be made at viscosities of 0.7–1.2 and preferably about 0.9 with no difficulty. The melting points of the polymers embodying the invention are unexpectedly high, usually being in excess of 200° C. with inherent viscosities of 0.8 or higher, melting points of 240–270° C. commonly being obtained. This melting point range compares closely to that of conventional terephthalate polyesters and is in marked contrast to the melting points of 80–150° C. which are common with previously known polyester-amides prepared by conventional methods. The polymers of the invention also possess great strength, flexibility and wear resistance comparable to the best unmodified polyesters, and in addition contain regularly recurring amide linkages which, without objectionable color formation, are effective to improve dyeability, processability, and moisture absorption.

In practicing the invention, the esters of the dicarboxylic acid, N,N-bis(p-carboxybenzoyl) alkylene diamine of the formula

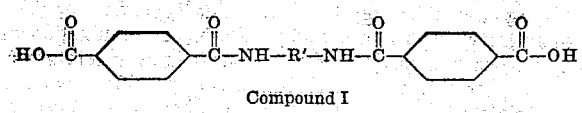

Compound I can be prepared in any manner which will give the material in monomeric form. The nature of the ester group is not usually of great significance since it is split off in the initial ester-interchange reaction with the glycol when the glycol ester is formed in the initial stages of the reaction. Thus, for example, the phenyl ester can be used, although the alkyl esters are preferred for convenience in removing the monohydric alcohol liberated in the initial ester-interchange stage of the process. Of the alkyl esters, the lower alkyl esters wherein the alkyl group contains 1–6 carbon atoms are preferred with the diisobutyl ester of Compound I being preferred because of its unique solubility characteristics which facilitate preparation of the monomer.

The preferred method for making the monomeric esters of N,N'-bis(p-carboxybenzoyl)alkylene diamines, and particularly the N,N'-bis(p-carbalkoxybenzoyl)polymethylene diamines containing 2–10 methylene groups in the polymethylene unit which are preferably employed, involves reacting one molar proportion of an alkylene diamine, preferably a polymethylene diamine, with two molar proportions of a p-carbalkoxy benzoyl chloride under controlled conditions whereupon the desired monomer is obtained in nearly quantitative yield. The diamine employed can be any of the alkylene diamines containing 2–10 carbon atoms; and, if desired, monomeric mixtures can be prepared by employing two or more diamines which is sometimes desirable when a polymer having particular properties is desired. Of the diamines, either straight or branched chain alkylene diamines can be used, with the polymethylene diamines typified by ethylene diamine, trimethylene diamine, tetramethylene diamine, pentamethylene diamine, hexamethylene diamine, heptamethylene diamine, octamethylene diamine, nonamethylene diamine and decamethylene diamine being preferred.

As indicated hereinabove, the nature of the ester groups on the monomer do not affect the course of the condensation process and the diamine or diamines can be reacted with p-carbophenoxy benzoyl chloride, p-carbomethoxy benzoyl chloride, p-carboethoxy benzoyl chloride, p-carbopropoxy benzoyl chloride, p-carboisopropoxy benzoyl chloride, p-carbobutoxy benzoyl chloride, p-carboisobutoxy benzoyl chloride or similar p-carbalkoxy benzoyl chlorides as desired to form the dicarboxylic monomer. The dicarboxylic monomers and their preparation is disclosed and claimed in the copending application of Williams and Laakso, Serial No. 504,105, filed concurrently herewith. The preparation of typical dicarboxylate monomers used in practicing the invention is illustrated in the following examples, although it will be understood that other monomers as defined herein can be used in practicing the invention regardless of the method of preparation of such dicarboxylate monomers.

*Example 1*

Under essentially dry conditions, 20 parts by weight (0.3 molar equivalent) of ethylene diamine was dissolved in 250 parts by volume of dry pyridine and the solution chilled to 0° C. With efficient stirring, 127.5 parts by weight (0.6 molar equivalent) of p-carbethoxybenzoyl chloride was added slowly to the solution at a rate whereby the temperature was maintained between 0° and 10° C. Stirring was continued for 15 minutes, and the reaction mixture was then poured into ice water. The light cream colored solid which precipitated was filtered by suction. By recrystallization from ethyl alcohol, pure white, N,N'-bis(p-carbethoxybenzoyl)ethylene diamine melting at 245.5°–246° C. was obtained in a yield of 90% of theoretical.

*Analysis.*—Calculated for $C_{22}H_{24}O_6N_2$: C, 64.2; H, 5.8; N, 6.8. Found: C, 64.5; H, 6.1; N, 7.3.

*Example 2*

Under essentially dry conditions, 34.8 parts by weight (0.3 molar equivalent) of hexamethylene diamine was dissolved in 500 parts by volume of dry pyridine and chilled to 0° C. With efficient stirring, 127.5 parts by weight (0.6 molar equivalent) of p-carbethoxybenzoyl chloride was added slowly to the solution while maintaining the solution temperature at 0° to 10° C. Stirring was continued for 15 minutes whereupon the reaction mixture was poured into ice water. The light cream colored solid which precipitated was filtered by suction and recrystallized from ethyl alcohol to give pure white N,N'-bis(p-carbethoxybenzoyl)hexamethylene diamine melting at 207°–208° C., in a yield of 88.8% of theoretical.

*Analysis.*—Calculated for $C_{26}H_{32}O_6N_2$: C, 66.7; H, 6.8; N, 5.9. Found: C, 67.0; H, 7.1; N, 5.9.

*Example 3*

A solution of 80 g. (2 moles) of sodium hydroxide in 300 ml. of water was added, with stirring, to a solution of 161 g. (1 mole) of tetramethylene diamine hydrochloride in 500 ml. of water. To the resulting solution, 1 liter of benzene was added, followed by 198.5 g. (1 mole) of p-carbomethoxybenzoyl chloride which was added all at once with efficient stirring. After 5 minutes, 150 ml. (1 mole) of sodium hydroxide solution was added rapidly. Thereafter at 15 minute intervals, p-carbomethoxy benzoyl chloride and sodium hydroxide solution were added successively until an additional 200 g. of the acid chloride and an additional 150 ml. of caustic solution had been added. When addition was completed, the reaction mixture was stirred for one hour and then poured into cold water to precipitate the product. The white product was filtered, washed with water, dried, recrystallized from dimethyl formamide, washed with alcohol and dried to give white crystalline N,N'-bis(p-carbomethoxy benzoyl)-tetramethylene diamine melting at 255–256° C. in a yield of 75.7% of theoretical.

*Analysis.*—Calculated for $C_{22}H_{26}O_6N_2$: C, 64.3; H, 5.8; N, 6.8. Found: C, 64.1; H, 6.1; N, 7.2.

*Example 4*

Under essentially anhydrous conditions, 198.5 g. (1 mole) of p-carbomethoxy benzoyl chloride was added dropwise to a well-stirred solution of 58 g. (0.5 mole) of hexamethylene diamine in 1000 ml. of dry pyridine. The temperature of the reaction mixture was maintained below 50° C. during the addition. The reaction mixture was stirred for one hour, poured into ice water, and the cream colored precipitate was filtered out and recrystallized from alcohol. The yield of pure white N,N'-bis(p-carbomethoxy benzoyl) hexamethylene diamine was 63% of theoretical.

*Analysis.*—Calculated for $C_{24}H_{28}O_6N_2$: C, 65.4; H, 6.4; N, 6.4. Found: C, 65.8; H, 6.4; N, 6.2.

The dicarboxylic monomers useful in practicing the invention can thus be methyl, ethyl, propyl, isopropyl, butyl, isobutyl or other diesters of such dicarboxylic acids as N,N'-bis(p-carboxybenzoyl)ethylene diamine, N,N'-bis(p-carboxybenzoyl)trimethylene diamine, N,N'-bis(p-carboxybenzoyl)tetramethylene diamine, N,N'-bis(p-carboxybenzoyl)pentamethylene diamine, N,N'-bis(p-carboxybenzoyl)hexamethylene diamine, N,N'-bis(p-carboxybenzoyl)heptamethylene diamine, N,N'-bis(p-carboxybenzoyl)octamethylene diamine, N,N'-bis(p-carboxybenzoyl)nonamethylene diamine, and N,N'-bis(p-carboxybenzoyl)decamethylene diamine; and such monomers can be employed singly or in combinations of two or more of these or similar dicarboxylate monomers as defined herein for condensation with the glycol.

In practicing the invention, one or more of the dicarboxylate monomers are condensed with one or more alkylene glycols containing 2-10 carbon atoms by heating the reaction mixture in the presence of an ester-interchange catalyst whereby a glycol diester of the dicarboxylic compound is formed in an initial stage, and this glycol ester undergoes condensation polymerization by continued heating under reduced pressure, with evolution of glycol, until the polymer reaches a fiber-forming state. The glycol can be a straight or a branched chain glycol or mixtures of glycols, the polymethylene glycols preferably being employed predominantly.

The glycols which are desirably employed for reaction with the dicarboxylate monomer are the polymethylene glycols such as ethylene glycol, trimethylene glycol, tetramethylene glycol, pentamethylene glycol, hexamethylene glycol, heptamethylene glycol, octamethylene glycol, nonamethylene glycol and decamethylene glycol which can be employed single or in mixtures of two or more, although other alkylene glycols such as 2,2-dimethyl-propanediol-1,3 and the like can be used alone or preferably together with a predominant amount of polymethylene glycol. The initial stage of the process embodying the invention can be illustrated graphically as follows:

Under ordinary reaction conditions, there is very little degradation of the dicarboxylate monomer and consequently the polymeric product consists predominantly of regularly recurring structural units of the formula

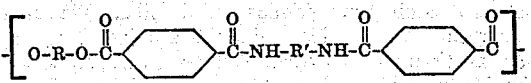

joined directly together in a linear polymer chain. This is in contrast to the random structure obtained by concomitant coreaction of a glycol, a dibasic acid and a diamine where there are competing polyester and polyamide reactions.

In carrying out the process embodying the invention, one molar proportion of the dicarboxylate monomer is reacted with at least two molar proportions of glycol. Preferably an excess of glycol is employed. The initial ester-interchange is readily effected by heating the mixture of glycol component and dicarboxylate monomer component in the presence of an ester-interchange catalyst and at a temperature above the melting point of the reactants. The initial stage of the reaction is usually carried out at atmospheric pressure and a temperature of 100°–300° C. and preferably 200°–300° C. for best results, although lower or higher temperatures can be employed in some cases. During the course of the ester-interchange in the initial stage of the process, monohydric alcohol is liberated corresponding to the nature of the ester groups on the dicarboxylate monomer or water when the free dicarboxylic acid is used. For best results, the water or alcohol is removed from the reaction zone as it is liberated in order to shift the reaction equilibrium to optimum formation of the glycol ester of the dicarboxylate monomer. As has been indicated, the dicarboxylate monomer is desirably employed in the form of a lower alkyl diester for ease of removal of the liberated alcohol. If desired, however, higher alkyl or phenyl esters can be used, as well as the free dicarboxylic acid or an ester-forming derivative thereof such as a salt, halide or amine.

The process is facilitated by use of an ester-interchange catalyst, a large number of such catalysts being known to the art. Typical ester-interchange catalysts which can be employed include the metal hydrides such as calcium hydride, lithium hydride, sodium hydride, or the like; metal oxides such as antimony trioxide, litharge, cerium oxide, germanium oxide and the like; double metal catalysts such as lithium aluminum stear-

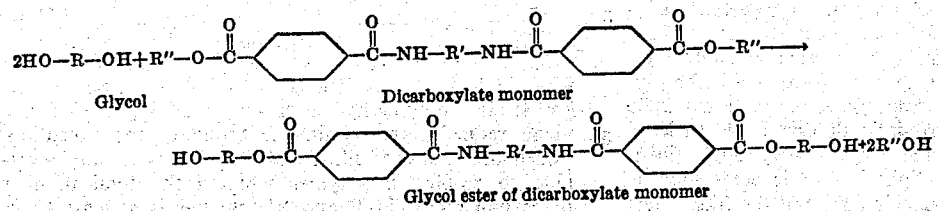

In this initial stage equation, R and R' represent alkylene groups of 2–10 carbon atoms, and R" is preferably a lower alkyl group but can be hydrogen, a higher alkyl group or a phenyl group as desired.

The second stage of the process embodying the invention can be illustrated graphically as follows:

ate, calcium aluminum acetate and similar catalysts containing an alkali or alkaline earth metal and an amphoteric metal, alcoholates of one or more of such metals as sodium, potassium, lithium, calcium, titanium, tin, magnesium, aluminum, zinc, and the like, alkaline reacting salts such as borates and carbonates of the alkali metals,

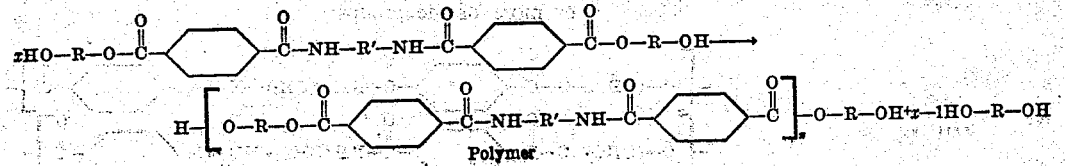

free metals such as sodium, potassium, lithium, calcium, cobalt, tin, germanium, cerium, magnesium, tin, lead, antimony and the like as well as salts of these and similar metals and other well known ester-interchange catalysts such as zirconium compounds and the like. Particularly good results are obtained with the titanium compounds such as titanium butoxide, sodium hydrogen titanium ethoxide butoxide and the like, preferably together with water as a co-catalyst for low color formation. The catalyst or catalyst mixture is preferably employed in a concentration of at least 0.001% by weight based on the weight of reactants with amounts of 0.001% to 0.05% by weight being preferred. Larger amounts of catalyst can also be used although such larger amounts usually are not necessary for optimum results.

The initial stage of the reaction is usually complete in 5-30 minutes; and, if desired, the temperature can be raised or the pressure reduced at the end of the first stage to effect completion of the removal of the alcohol liberated during the initial stage. Polymerization of the glycol ester of the dicarboxylic compound is then effected to the desired degree by continuing the heating under reduced pressure at least until the polymer reaches the fiber-forming stage. The polymerization can be effected by first obtaining a low viscosity polymer in powder form, and then continuing the polymer build-up in powder form under vacuum, or by continuing the heating after the initial stage under reduced pressure whereby the polymer remains molten until the desired molecular weight and inherent viscosity is achieved.

The polymers embodying the invention are polymerized until a fiber-forming stage is achieved, i.e. until a rod dipped into the melt will pull a filament when drawn from the melt. Usually for optimum results, the polymerization is carried out until an inherent viscosity of at least 0.8 is attained with viscosities of 0.8-1.1 being preferred, although lower or higher viscosities may be desired in certain cases. The polymers of the invention usually have melting points above 200° C. The preferred polymer compositions are those having melting points in the range of about 240°-280° C., since the polymers melting above about 280° C. are difficult to extrude and process in commercial practice.

As has been indicated, any one or more of the alkylene glycols containing 2-10 carbon atoms can be condensed with any one or more of the dicarboxylate monomers as defined herein. The resulting polymers can be used alone or in blends of two or more of such polymers, or blends of such polymers with other polymeric materials such as polyesters, polyamides, copolyesters, polyesteramides and the like. In some cases, it is also desirable to modify the polymers by coreacting another dicarboxylic acid (preferably in ester form) with the glycol and dicarboxylate monomer, such other dicarboxylic acids being typified by aromatic dibasic acids such as terephthalic acid, isophthalic acid, 4,4'-sulfonyl dibenzoic acid and the like or aliphatic dibasic acids such as adipic acid, sebacic acid, azelaic acid and the like. The polymers of the invention can be quenched following polymerization by cooling to a temperature below the minimum crystallization temperature, usually below about 80° C. The polymerization proceeds rapidly and ordinarily the fiber-forming stage is reached within 10-30 minutes, although the time necessary for polymerization will vary depending upon the heating temperature, kind and amount of catalyst and similar variable factors. The polymerization is facilitated by removal from the reaction zone of the glycol liberated during the polymerization.

The polymers thereby obtained can be extruded from the melt to form filaments or sheets as desired. The resulting shaped articles are then oriented by being stretched either laterally or longitudinally or both whereby a marked increase in physical properties is obtained. The degree of stretching will vary somewhat depending upon the polymer composition and the properties desired, but sheets, films, fibers, etc. are usually stretched 50-600% of their original extruded dimension for best results. The shaped articles are usually cold-drawn, i.e. drawn at a temperature between the second order transition temperature and the minimum crystallization temperature of the polymer; although, unlike the usual polyesters, the polymers embodying the invention can be oriented by drawing at temperatures of as much as 50° above the minimum crystallization temperature in some cases.

The fibers, films, sheets, etc. which have been drawn are characterized by exceptional physical and mechanical properties, including strength, flexibility, wear resistance and the like, comparable to terephthalate polymers. In addition, the polymers of the invention have unusually high heat distortion temperatures which are often as much as 40° C. above the ordinary heat distortion temperature of terephthalate polyesters which have been oriented but not relaxed. The polymers of the invention thus possess the excellent melting point and physical characteristics of the best polyesters known heretofore but combine this with unusually high heat distortion temperatures, excellent dye affinity, and moisture adsorption higher than that of conventional polyesters. The high heat distortion characteristics are attained by heating the oriented polymer above its minimum crystallization temperature, as for example at 170° C., to cause crystallization but without the necessity of shrinking the stretched polymer as is usually the case.

In fiber applications, filaments having strength of as high as 6-8 grams per denier can be readily obtained, combined with good dyeability and moisture absorption which usually are sacrificed in conventional polyesters. The polymers also possess excellent utility in photographic applications as for example for use as film base for carrying photosensitive silver halide emulsions in black-and-white or color film. The unusually high heat distortion temperature also makes these polymers unique for applications where dimensional stability against thermal distortion is a serious problem.

As has been indicated, any of the polymers consisting essentially of recurring structural units of the formula

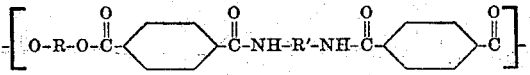

wherein R is an alkylene group of 2-10 carbon atoms and R' is a polymethylene group containing 2-10 methylene radicals, are within the scope of the invention. For manufacture of films and fibers, it is usually desirable to employ a polymer wherein the total number of carbon atoms in R and R' together is at least 10 in at least half of the recurring structural units. For best results and optimum combination of properties, the combined number of carbon atoms in R and R' is desirably at least 12 in at least one quarter of the recurring structural units. The polymers which have shown particular utility are those wherein a substantial amount of the polymer consists of structural units wherein R' is hexamethylene and R is either tetramethylene, pentamethylene or hexamethylene. Thus, for example, the polymers which consist essentially of a succession of one or more of the groups

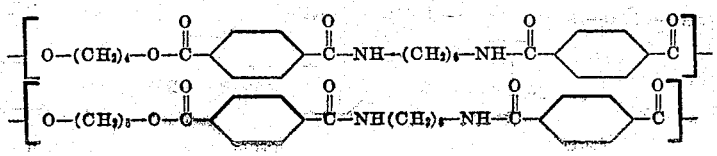

or

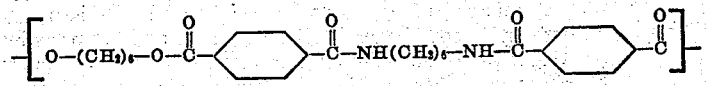

joined together in linear configuration have melting points above 240° C., and usually in the range of 240°–265° C., and can be readily extruded from the melt into films, sheets or fibers which, after drawing, possess excellent mechanical and physical properties combined with good dye affinity and moisture absorption characteristics.

In the manufacture of film or sheeting, the polymer is desirably extruded from the melt either onto a casting roll or between paired rolls and then drawn both longitudinally and laterally, either concomitantly or successively, to from 100–600% of its original dimensions in order to orient the molecules. Thereafter, the oriented film or sheet is desirably heated at a temperature above the minimum crystallization temperature until the desired degree of crystallization results. In the case of film to be used for photographic applications where it is desirable to coat the film with photosensitive silver halide emulsions or other coating layers, the film can be coated with a subbing material, such as a resin or copolymer sub before the orientation or between the drafting steps or before the heat treatment following orientation. In some cases, particularly with modified polyester subs of good solubility, it is more convenient to sub the oriented and crystallized film after the film processing has been completed. The subbed film can then be supplied with the usual photosensitive emulsion layers, anti-halation backing, etc. in accordance with well known photographic practice.

In the manufacture of fibers, the molten polymer is extruded through a spinneret and quenched. The resulting fiber is then drafted 60–600% and heat treated for crystallization. The resulting fibers have hot bar sticking temperatures above 200° C. in most cases, combined with strength of the order of 6–8 grams per denier, excellent dye affinity for most textile dyes and moisture absorption characteristics which make the fibers resemble natural fibers more than is generally the case with synthetic polyester fibers. In contrast to the usual polyesters containing amino groups, very little color formation is observed and textiles prepared from fibers embodying the invention can be dyed to deep shades or with pastel dyes or fleeting tints as desired. Consequently, the polymers of the invention show unique versatility among the synthetic condensation polymers since they combine the desirable characteristics of both the polyesters and the polyamides without the disadvantages of either type.

The improved results obtained in accordance with the invention appear to result from the unusually regular structure which is obtained by condensing the glycol with a monomeric ester of N,N'-bis(p-carboxybenzoyl)-polymethylene diamine. This is in contrast to the results which are obtained by a variety of methods involving competing reactions having different rate constants such as ester-ester interchange, ester-glycol interchange, amine-ester interchange and amine-glycol interchange. The amine-ester interchange usually proceeds most rapidly and hampers the formation of a regular polymer. Thus, in the usual polyester-amide reactions, polyamide is usually produced in preference to the other possible combinations, except where the ratio of components in order of addition prevents the possibility of polyester-amides of regular structure. Various heterogeneous polyester-amide processes which do not give results comparable to the present invention under usual practice include first reacting a terephthalate ester with a polymethylene diamine and reacting the product with a glycol; first reacting the terephthalate ester and the glycol and then reacting the resulting product with the polymethylene diamine; or forming prepolymers terminating in amino groups for reaction with ester groups or terminating in ester groups for reaction with diol or amine groups. In the usual case, it is not feasible to stop such reactions at the desired monomeric dicarboxylate stage necessary to produce the polymers of this invention, and varying the order of addition of the various components does little to improve the polymers.

The improved results obtained by means of the invention are most readily illustrated by comparison with the results obtained by heterogeneous polyester-amide processes. For example, under comparable conditions, the heterogeneous polyester-amide from hexamethylene diamine, terephthalate ester, and hexane-1,6-diol has a melting point of 211° C. and an inherent viscosity of 0.60 whereas the polymer of this invention prepared from hexane-1,6-diol and the monomeric ester of N,N'-bis(p-carboxybenzoyl)hexamethylene diamine has a melting point of 270° and an inherent viscosity of 1.16. In the case of this particular type of polymer, it is usually necessary to achieve an inherent viscosity of the order of 0.8 in order to obtain satisfactory fiber-forming characteristics and good physical properties. The following Examples 5–9 illustrate the results obtained by heterogeneous processes in contrast to the remainder of the examples illustrating the preparation of the homogeneous polymers of this invention.

*Example 5*

A mixture of 11.6 g. (0.1 mole) of hexamethylene diamine and 39.6 g. (0.2 mole) of dimethyl terephthalate was heated under nitrogen at 250° C. After two minutes, a violent evolution of methanol occurred, and the melt rapidly became viscous. To the melt was added 50 g. (0.42 mole) of hexane-1,6-diol and 0.5 ml. of catalyst solution prepared by adding 0.1 ml. of titanium butoxide to a solution of 0.1 g. of sodium in 50 ml. of absolute ethanol. The resulting mixture was heated for one hour at 270° C. and atmospheric pressure followed by heating under vacuum at 270° C. The viscosity of the melt rose very slowly, and a very low molecular weight polymer was obtained containing 3.5% nitrogen.

*Example 6*

A mixture of 39 g. (0.2 mole) of dimethyl terephthalate, 50 g. (0.42 mole) of hexane-1,6-diol, 11.6 g. (0.1 mole) of hexamethylene diamine and 0.2 ml. of the catalyst solution described in the preceding example was heated at 175–250° C. for 30 minutes and at 250° C. for 20 minutes. The melt was then heated under vacuum at 275° C. for 10 minutes, but the polymer obtained was insoluble in phenol-tetrachloroethane solvent commonly used for inherent viscosity determinations. The polymer contained 5.2% nitrogen.

*Example 7*

A mixture of 39.6 g. (0.2 mole) of dimethyl terephthalate, 50 g. (0.42 mole) of hexane-1,6-diol and 0.5 ml. of the catalyst solution of Example 5 was heated at 250° C. for 30 minutes. Thereafter, 11.6 g. of hexamethylene diamine was added, and the resulting mixture was heated for 45 minutes at 250° C. followed by stirring under vacuum at 275° C. The polymer obtained was of low molecular weight with an inherent viscosity of 0.44 and a nitrogen content of 3.0%.

*Example 8*

A mixture of 39.6 g. (0.2 mole) of dimethyl terephthalate, 45 g. (0.5 mole) of butane-1,4-diol and 0.5 ml. of the catalyst solution of Example 5 was heated at 240° C. for 30 minutes. To the melt was added 5.8 g. (0.5 mole) of hexamethylene diamine, and the mixture was stirred under vacuum for 20 minutes at 275° C. The product was of low molecular weight and had an inherent viscosity of only 0.24.

Example 9

A 9.7 g. portion (0.02 mole) of 1,6-bis(p-carboethoxyphenyl carbonyloxy)hexane was melted under an atmosphere of dry nitrogen at 240° C. To the melt was added 1.2 g. (0.01 mole) of hexamethylene diamine, and the temperature was raised to 275° C. over a 20 minute period. To the mixture was added 1.9 g. (0.01 mole) of dimethyl terephthalate and 2.4 g. (0.02 mole) of hexane-6-diol. After heating the mixture at 275° C. and 0.1 mm. pressure for 20 minutes, a polymer was obtained having an inherent viscosity of 0.6 and a melting point of 210° C.

The heterogeneous polymers prepared as described in the preceding Examples 5–9 have little utility as film and fiber-forming materials as compared to the homogeneous polymers embodying this invention, as described in the following examples, which are among the best materials known for fiber and film applications.

Example 10

To a mixture of 8.2 parts by weight of N,N'-bis(p-carbethoxybenzoyl)ethylene diamine and 11 parts by weight of decane-1,10-diol at 250° C. under nitrogen was added 0.1 part by volume of a catalyst solution prepared by the addition of 0.1 part by volume of titanium butoxide to a solution of 0.1 part by weight of sodium in 50 parts by volume of absolute ethanol. The temperature of the reaction mixture was held at 240–270° C. for 10 minutes during which time ester-interchange occurred with formation of a glycol ester and liberation of ethanol. The ethanol was removed from the reaction zone as formed by means of a water aspirator. Thereafter, the reaction mixture was heated at 270° C. and 0.1 mm. Hg pressure for 15 minutes. The resulting polymer had an inherent viscosity of 0.71 and a melting point of 274° C. It could be readily extruded from the melt into films, sheets or fibers which were quenched, drafted about 400% and heat treated at about 170° C. The resulting oriented articles were extremely strong and flexible, possessed excellent dye affinity and exhibited unusual thermal dimensional stability.

The polymers of the invention are also useful in making tubing, molded articles, sheeting for packaging, coating materials, and the like.

Example 11

A mixture of 9.4 parts by weight of N,N'-bis(carbethoxybenzoyl)hexamethylene diamine and 10 parts by weight of pentane-1,5-diol was melted at 250° C. under a dry nitrogen stream. Catalyst was added as in the preceding example, and the reaction mixture was heated for 16 minutes at 240–270° C. with removal of the liberated alcohol to effect ester-interchange. Thereafter, the reaction mixture was heated at 270° C. and 0.1 mm. Hg pressure for 8 minutes with continuous removal of glycol liberated in the condensation. The resulting polymer had an inherent viscosity of 0.97 and a melting point of 255° C. The polymer was readily extruded from the melt into films and fibers. After drafting and heat treating without relaxation, fibers having strength of the order of 6–8 g. per denier and excellent dyeability are obtained. The moisture absorption is of the order of 1% for this and many similar polymers which makes them particularly adapted for textile applications wherein the highly hydrophobic character of the usual polyesters is a disadvantage. The polymer was of particular utility for film base in the manufacture of photographic film, and could be subbed with resin subs, such as the vinylidene chloride copolymers, whereby usual black-and-white or color photographic film could be prepared in accordance with usual practice.

Example 12

A mixture of 9.4 parts by weight of N,N'-bis(p-carbethoxybenzoyl)hexamethylene diamine and 7.1 parts by weight of hexane-1,6-diol was melted at 250° C. under nitrogen. After addition of ester-interchange catalyst as described, the reaction mixture was heated at 245–270° C. for 5 minutes with removal of the liberated alcohol. Thereafter, the mixture was polymerized by heating for 14 minutes at 270° C. and 0.1 mm. Hg pressure. The polymers obtained had an inherent viscosity of 0.96 and a melting point of 265° C. Although this polymer could be spun into fibers of excellent mechanical and physical properties, it was of particular utility for film base in photographic applications. In black-and-white or color photographic film, the oriented polymer shows excellent wear resistance, strength and resistance to flex cracking. Its heat distortion temperature is about 180° C. which is highly desirable for thermal dimensional stability. Once oriented, it does not readily lose its orientation, and it exhibits orientation even when drawn at temperatures well above its minimum crystallization temperature. Its melting point makes melt extrusion practical on a commercial scale, without having an objectionably low softening temperature. The amide linkages in the monomer employed as well as in the other monomers embodying the invention are very stable under the polymerization conditions so that the content of free amine is very low in the polymers. Consequently, the problem of objectionable color formation common to polyesteramide processes known heretofore is largely obviated in the process of this invention.

As can be seen from the examples, the polymerization in accordance with this invention proceeds rapidly to the fiber-forming stage which is a definite advantage from the standpoint of commercial practice. The ease of ester-interchange and condensation makes the manufacture of polymer possible by continuous as well as batch processes. Furthermore, the polymerization can be carried to any desired molecular weight and inherent viscosity with ease.

If desired, mixtures of the dicarboxylate monomers and/or the glycols can be used in practicing the invention. The use of mixtures is particularly desirable when a short chain glycol is used or a dicarboxylate monomer containing a short carbon chain between the nitrogen atoms, since the short chain compounds tend to give higher melting point polymers than are desired for commercial melt extrusion operations. As has been indicated, it is usually desirable to employ a substantial amount of glycol and dicarboxylate monomer wherein the number of carbon atoms in the polymethylene portions of these two materials totals at least 10 and preferably at least 11. The long chain glycols, such as decane-1,10-diol, are relatively scarce and expensive, however, and rather than prepare a simple polymer of decane-1,10-diol and N,N'-bis(p-carbalkoxybenzoyl)ethylene diamine as described in Example 10, it is preferable to employ a mixture of dicarboxylate monomers or glycols as shown in the following example.

Example 13

A mixture of 23.4 g. (0.05 mole) of N,N'-bis(p-carbethoxybenzoyl)hexamethylene diamine, 20.6 g. (0.05 mole) of N,N'-bis(p-carbethoxybenzoyl)ethylene diamine, 40 g. of hexane-1,6-diol and 0.5 ml. of catalyst solution (prepared by dissolving 0.2 g. of sodium and 3.0 ml. of titanium butoxide in sufficient absolute ethanol to give a final volume of 100 ml.) was heated at 250–270° C. for 20 minutes to effect ester-interchange. The reaction mixture was then heated for 20 minutes at 275° C. and 0.3 mm. Hg pressure to effect polymerization. The resulting polymer had an inherent viscosity of 0.84 and a melting point of 262° C. Films and fibers of excellent physical characteristics were readily extruded from a melt of this polymer, and it was particularly useful for use as film base.

Example 14

In some cases it is desirable to employ a mixture of glycols, particularly from the economic standpoint. For example, a charge consisting of 46.8 g. (0.1 mole) of N,N'-bis(p-carbethoxybenzoyl)hexamethylene diamine, 17.7 g. (0.15 mole) of hexane-1,6-diol, 13.5 g. (0.15 mole) of butane-1,4-diol and 0.5 ml. of catalyst solution (prepared by dissolving 0.2 g. of sodium and 3.0 ml. of titanium butoxide in sufficient absolute ethanol to make 100 ml. of solution) was subjected to ester-interchange for 20 minutes at 240–275° C. Polymerization was then effected by heating the melt for 20 minutes at 275° C. and 0.1 mm. Hg pressure. The resulting polymer having an inherent viscosity of 1.09 and a melting point of 240° C. was equally as useful for manufacture of films and fibers as the other polymers embodying the invention.

Example 15

In the preceding example, equal molar proportions of the tetramethylene glycol and the hexamethylene glycol were employed; but other proportions can be used with equally advantageous results. Thus, a charge of 46.8 g. (0.1 mole) of N,N'-bis(p-carbethoxybenzoyl)hexamethylene diamine, 19.8 g. (0.22 mole) of butane-1,4-diol, 9.6 g. (0.08 mole) of hexane-1,6-diol and 0.5 ml. of the catalyst solution described in the preceding example was heated for 20 minutes at 245–275° C. to effect ester-interchange. The melt was then heated for 20 minutes at 275° C. and 0.1 mm. Hg pressure. The resulting polymer had an inherent viscosity of 1.01 and melting point of 269° C.

Example 16

Particularly good results from the standpoint of quenchability of the polymers result from use of titanium butoxide catalyst instead of other well known ester-interchange catalysts such as sodium hydrogen titanium ethoxide butoxide catalyst. A catalyst solution was prepared by dissolving 3 g. of freshly distilled titanium butoxide in sufficient absolute alcohol to make 100 ml. of solution. A charge of 46.8 g. (0.1 mole) of N,N'-bis(p-carbethoxybenzoyl)hexamethylene diamine, 35.4 g. (0.3 mole) of hexane-1,6-diol and 0.5 ml. of the catalyst solution was heated for 20 minutes at 245–275° C., followed by 20 minutes heating at 275° C. and 0.1 mm. Hg pressure. The polymer obtained had an inherent viscosity of 1.21 and a melting point of 264° C. It quenched readily and was of particular utility for film base for photographic film.

Example 17

The nature of the ester group on the dicarboxylate monomer does not affect the course of the polymerization since this group splits off during the ester-interchange occurring in the first stage of the process. Because of its unusual solubility characteristics, the isobutyl ester is easier to prepare and gives excellent results in the condensation. A charge of 52.5 g. (0.1 mole) of N,N'-bis(p-carboisobutoxybenzoyl)hexamethylene diamine, 35.4 g. (0.3 mole) of hexane-1,6-diol and 0.5 ml. of the catalyst solution described in the preceding example was heated for 20 minutes at 245–275° C. followed by 15 minutes at 275° C. and 0.12 mm. Hg pressure. The polymer obtained had an inherent viscosity of 1.06, a melting point of 264° C. and quenched readily.

Example 18

The amount of catalyst employed can be varied without significantly affecting the course of the reaction. Thus, the process described in the preceding example was repeated using double the amount of catalyst. The polymer obtained had an inherent viscosity of 1.13, a melting point of 264° C. and quenched readily.

Example 18

Ordinarily, many of the ester-interchange catalysts present problems in preparation and handling because of their extreme water susceptibility. The polymers embodying the invention can be prepared with such ester-interchange catalysts containing water as a co-catalyst, however, and show even less color formation than with the other catalysts. Thus, a mixture of 1 molar proportion of N,N'-bis(p-carbethoxybenzoyl)hexamethylene diamine and 3 molar proportions of hexane-1,6-diol was heated for 15 minutes under nitrogen at 245–275° C. in the presence of catalyst consisting of equimolar amounts of titanium butoxide and water. The second stage of the process was carried out at 275° C. and 0.1–0.5 mm. pressure for 20 minutes. The polymer obtained had an inherent viscosity of 1.20 and a melting point of 263° C. and was nearly pure white in color.

Example 19

A mixture of 0.1 mole of N,N'-bis(p-carbomethoxybenzoyl)hexamethylene diamine, 0.3 mole of hexane-1,6-diol and 0.5 ml. of sodium hydrogen titanium ethoxide butoxide solution (prepared by dissolving under nitrogen 0.2 g. of sodium and 3 ml. of freshly distilled titanium butoxide in sufficient alcohol to make 100 ml. of solution) was heated for 20 minutes at 245–275° C. for 20 minutes under nitrogen, and then heated for 15 minutes at 275° C. and 0.1–0.5 mm. pressure. The polymer obtained had an inherent viscosity of 0.69 and a melting point of 264° C.

Example 20

A mixture of 0.1 mole of N,N'-bis(p-carbomethoxybenzoyl)hexamethylene diamine, 0.3 mole of hexane-1,6-diol, and 0.5 ml. of catalyst solution, as described in the preceding example but containing 2 equivalents of water per equivalent of sodium, was heated at 245–275° C. for 20 minutes under nitrogen and for 15 minutes at 275° C. and 0.1–0.5 mm. pressure. The polymer was of exceptionally good color and had an inherent viscosity of 1.09 and a melting point of 263° C.

Example 21

A mixture of 0.1 mole of N,N'-bis(p-carboisobutoxybenzoyl)hexamethylene diamine, 0.3 ml. of hexane-1,6-diol and water-containing catalyst as described in the preceding example was heated at 245–275° C. for 20 minutes under nitrogen followed by 15 minutes at 275° C. and 0.1–0.5 mm. pressure. The resulting nearly pure white polymer had an inherent viscosity of 1.06 and a melting point of 264° C.

Example 22

For continuous processing it is usually desirable to effect the two stages of the condensation process in sequence on the melt. At times, however, it is desirable to prepare a prepolymer which can then be polymerized to the desired degree as needed by a powder build-up method. In a typical example, 52 g. of N,N'-bis(p-carboisobutoxybenzoyl)hexamethylene diamine, 40 g. of hexane-1,6-diol, and 0.5 ml. of sodium ethoxide-titanium butoxide solution were heated at 245–275° C. for 20 minutes and at 275° C. and 0.1 mm. pressure for 5 minutes. The resulting low molecular weight polymer was cooled under nitrogen and pulverized. The powder was then reheated at 235° C. and 0.1 mm. pressure for one hour to give a polymer having an inherent viscosity of 0.72 and a melting point of 260° C.

Example 23

A prepolymer was prepared and powdered as in the preceding example. The prepolymer was then reheated for 25 minutes at 242–248° C. and 0.1 mm. pressure to give a polymer having an inherent viscosity of 1.07 and a melting point of 267° C.

Example 24

A mixture of 0.6 mole of N,N'-bis(p-carboethoxybenzoyl)ethylene diamine, 0.4 mole of N,N'-bis(p-carboethoxybenzoyl)hexamethylene diamine and 3 moles of butane-1,4-diol was condensed in accordance with the process described in Example 11. The resulting polymer had an inherent viscosity of 0.85 and a melting point of 270° C.

*Example 25*

A mixture of 0.6 mole of N,N'-bis(p-carboethoxybenzoyl)ethylene diamine, 0.4 mole of N,N'-bis(p-carboethoxybenzoyl)hexamethylene diamine and 3 moles of hexane-1,6-diol was condensed as described in Example 11. The resulting polymer had an inherent viscosity of 0.87 and a melting point of 270° C.

Thus, by means of this invention, a new class of highly useful polymers are provided which are of particular utility in the manufacture of fibers, films and sheeting. The examples illustrate the unique combination of properties possessed by the polymers of the invention, and similar results are obtained with the other polymers within the scope of the invention as described herein. By means of this invention, it is possible to obtain in a single polymer the advantageous characteristics of both the polyesters and the polyamides.

In effecting the condensation reaction, the ester-interchange stage of the process is usually carried out at a temperature above 200° C. or above the melting point of the reactants. The second or polymerization stage is also usually carried out above 200° C. and can be effected above the melting point of the glycol ester (and the polymer being formed) in the melt process or at a temperature not more than 20° C. below the melting point of the glycol ester in the powder polymerization process. In the case of the polymers prepared from such glycols as tetramethylene, pentamethylene or hexamethylene glycol, the temperature in the polymerization stage is preferably at least 240° C. The temperature employed can be varied, of course, depending upon the polymerization time desired, the degree of vacuum employed, the melting point of the reactants and products and similar variable factors. The temperature employed should be at least as high as the boiling point of the glycol liberated at the pressure employed and can therefore be at or about the boiling temperature of the glycol if atmospheric pressure is employed or if a lower pressure is employed during the polymerization stage. The polymerization stage is desirably carried out at pressures below about 1 mm. Hg for optimum results with pressures of 0.1–0.5 mm. or lower being particularly suitable. The polymerization stage is continued until the polymer obtained is capable of forming fibers and films (including sheets) which can be oriented to give the highly flexible and strong shaped articles for which these polymers are particularly adapted.

Although the invention has been described in detail with particular reference to certain preferred embodiments thereof, it will be understood that variations and modifications can be effected within the spirit and scope of the invention as described hereinabove and as defined in the appended claims.

We claim:
1. A highly polymeric material capable of forming fibers and films, said polymeric material having a melting point of at least 200° C. and an inherent viscosity of at least 0.7 and being formed by reaction of one molar proportion of a single dicarboxylate monomer with at least two molar proportions of a single glycol at a temperature of at least 200° C., said polymeric material consisting essentially of a succession of recurring structural units of the formula

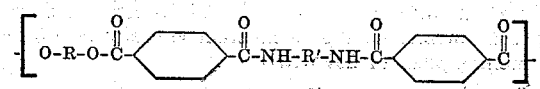

wherein R and R' are alkylene groups of 2–10 carbon atoms, said polymeric material resulting solely from the condensation polymerization of monomeric material consisting of at least one alkylene glycol of 2–10 carbon atoms with a single dicarboxylic acid monomer having the functional formula

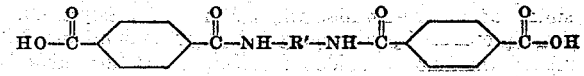

wherein R' is an alkylene group of 2–10 carbon atoms.

2. A highly polymeric material capable of forming orientable fibers and films and having a melting point of at least 200° C. and an inherent viscosity of at least 0.7 and consisting essentially of a succession of recurring structural units of the formula

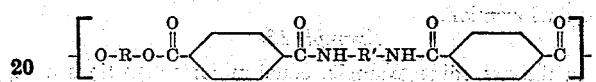

wherein R and R' are alkylene groups of 2–10 carbon atoms, the combined number of carbon atoms in R and R' being at least 10 in at least half of said recurring structural units, said polymeric material resulting solely from the condensation polymerization of monomeric material consisting of at least one alkylene glycol of 2–10 carbon atoms and a single dicarboxylic acid monomer having the functional formula

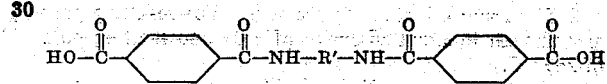

wherein R' is an alkylene group of 2–10 carbon atoms, said dicarboxylate monomer amounting to one molar proportion for at least two molar proportions of said glycol, and said condensation being effected at a temperature of at least 200° C.

3. A highly polymeric material capable of forming orientable fibers and films and having a melting point of at least 200° C. and an inherent viscosity of at least 0.7 and consisting essentially of a succession of recurring structural units of the formula

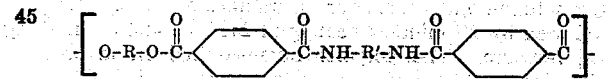

wherein R and R' are alkylene groups of 2–10 carbon atoms, the combined number of carbon atoms in R and R' being at least 12 in at least one quarter of said recurring structural units, said polymeric material resulting solely from the condensation polymerization of monomeric material consisting of at least one alkylene glycol of 2–10 carbon atoms and a single dicarboxylic acid monomer having the functional formula

wherein R' is an alkylene group of 2–10 carbon atoms, said dicarboxylate monomer amounting to one molar proportion for at least two molar proportions of said glycol, and said condensation being effected at a temperature of at least 200° C.

References Cited in the file of this patent

UNITED STATES PATENTS

| | | |
|---|---|---|
| 2,071,250 | Carothers | Feb. 16, 1937 |
| 2,692,253 | Holmen | Oct. 19, 1954 |
| 2,839,508 | Williams et al. | June 17, 1958 |
| 2,851,443 | Williams et al. | Sept. 9, 1958 |